United States Patent
Miura et al.

(10) Patent No.: US 11,453,437 B2
(45) Date of Patent: Sep. 27, 2022

(54) CONTROL DEVICE AND STEERING DEVICE

(71) Applicant: JTEKT CORPORATION, Osaka (JP)

(72) Inventors: Yuichi Miura, Kariya (JP); Takashi Kojima, Kashihara (JP); Yuji Kariatsumari, Kitakatsuragi-gun (JP)

(73) Assignee: JTEKT CORPORATION, Kariya (JP)

( * ) Notice: Subject to any disclaimer, the term of this patent is extended or adjusted under 35 U.S.C. 154(b) by 264 days.

(21) Appl. No.: 16/987,821

(22) Filed: Aug. 7, 2020

(65) Prior Publication Data
US 2021/0039709 A1 Feb. 11, 2021

(30) Foreign Application Priority Data
Aug. 9, 2019 (JP) .............................. JP2019-146922

(51) Int. Cl.
*B62D 6/00* (2006.01)
*B62D 5/04* (2006.01)
*B60W 30/045* (2012.01)
*B60W 30/18* (2012.01)

(52) U.S. Cl.
CPC ........... *B62D 6/002* (2013.01); *B60W 30/045* (2013.01); *B60W 30/18145* (2013.01); *B62D 5/0418* (2013.01)

(58) Field of Classification Search
CPC ..... B62D 15/025; B62D 5/0418; B62D 6/002
See application file for complete search history.

(56) References Cited

U.S. PATENT DOCUMENTS

| 2004/0186647 | A1* | 9/2004 | Ono ..................... B60T 8/1755 701/80 |
| 2005/0096830 | A1* | 5/2005 | Ohta ..................... B60T 8/172 701/1 |
| 2009/0024293 | A1 | 1/2009 | Takenaka et al. |
| 2009/0243237 | A1 | 10/2009 | Sasaki |
| 2015/0012183 | A1 | 1/2015 | Sugai |

FOREIGN PATENT DOCUMENTS

| EP | 2824015 A1 | 1/2015 |
| JP | 2013-184619 A | 9/2013 |

OTHER PUBLICATIONS

Feb. 8, 2021 Search Report issued in European Patent Application No. 20189869.9.

\* cited by examiner

*Primary Examiner* — Adam R Mott
*Assistant Examiner* — Sandeep Anthony Stanley
(74) *Attorney, Agent, or Firm* — Oliff PLC

(57) ABSTRACT

A control device includes an electronic control unit. The electronic control unit determines a right steering command value and a left steering command value. The electronic control unit acquires path information indicating a target path for the vehicle. The electronic control unit corrects a steering command value such that the vehicle travels along the target path. The electronic control unit corrects the right steering command value and the left steering command value so as to bring the distribution ratio between a skid angle of a right steered wheel and a skid angle of a left steered wheel to a target distribution ratio.

5 Claims, 5 Drawing Sheets

CONTROL DEVICE AND STEERING DEVICE

CROSS-REFERENCE TO RELATED APPLICATION

This application claims priority to Japanese Patent Application No. 2019-146922 filed on Aug. 9, 2019, incorporated herein by reference in its entirety.

BACKGROUND

1. Technical Field

The present disclosure relates to a control device that independently steers steered wheels disposed on the right and left sides, and to a steering device.

2. Description of Related Art

In some steering devices for vehicles, a steering wheel and a steering operation mechanism are not mechanically connected to each other, and the steered angles of steered wheels are controlled independently. Japanese Unexamined Patent Application Publication No. 2013-184619 (JP 2013-184619 A), for example, describes a technique of computing right and left target tire lateral forces that minimize the total sum of tire lateral forces in order to reduce the travel resistance during straight travel, and controlling the toe angle such that the actual tire lateral forces obtained from load sensors coincide with the target values.

SUMMARY

The control on the toe angle according to the related art is performed for the purpose of improving the fuel efficiency during straight travel and the straight travel stability during deceleration, and not intended to improve the stability or the fuel efficiency in turning through a curve.

The present disclosure is directed to improving the fuel efficiency while maintaining the target turning radius and speed.

A first aspect of the present disclosure provides a control device. The control device is configured to independently control respective steered angles of a right steered wheel and a left steered wheel disposed on right and left sides with respect to an advancing direction of a vehicle. The control device includes an electronic control unit. The electronic control unit is configured to determine a right steering command value, which indicates the steered angle of the right steered wheel, and a left steering command value, which indicates the steered angle of the left steered wheel, based on a steering command value that indicates a steering direction of the vehicle. The electronic control unit is configured to acquire path information that indicates a target path for the vehicle. The electronic control unit is configured to correct the steering command value based on at least one of a plurality of state amounts that indicate a behavior of the vehicle during travel such that the vehicle travels along the target path. The electronic control unit is configured to correct the right steering command value and the left steering command value based on skid angle information that indicates a skid angle of the right steered wheel and a skid angle of the left steered wheel so as to bring a distribution ratio between the skid angle of the right steered wheel and the skid angle of the left steered wheel to a target distribution ratio.

With the configuration described above, the cornering drag can be reduced while maintaining the speed and the turning radius of the vehicle which is traveling through a curve.

A second aspect of the present disclosure provides a steering device. The steering device includes a control device configured to independently control respective steered angles of a right steered wheel and a left steered wheel disposed on right and left sides with respect to an advancing direction of a vehicle, a left steering operation mechanism, and a right steering operation mechanism. The control device includes an electronic control unit. The electronic control unit is configured to determine a right steering command value, which indicates the steered angle of the right steered wheel, and a left steering command value, which indicates the steered angle of the left steered wheel, based on a steering command value that indicates a steering direction of the vehicle. The electronic control unit is configured to acquire path information that indicates a target path for the vehicle. The electronic control unit is configured to correct the steering command value based on at least one of a plurality of state amounts that indicate a behavior of the vehicle during travel such that the vehicle travels along the target path. The electronic control unit is configured to correct the right steering command value and the left steering command value based on skid angle information that indicates a skid angle of the right steered wheel and a skid angle of the left steered wheel so as to bring a distribution ratio between the skid angle of the right steered wheel and the skid angle of the left steered wheel to a target distribution ratio. The left steering operation mechanism includes a left actuator that steers the left steered wheel. The right steering operation mechanism includes a right actuator that steers the right steered wheel.

With the configuration described above, the cornering drag can be reduced while maintaining the speed and the turning radius of the vehicle which is traveling through a curve.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A control device and a steering device according to an embodiment of the present disclosure will be described below with reference to the drawings. The numerical values, shapes, materials, constituent elements, positional relationship among the constituent elements, state of connection, steps, order of the steps, etc. are exemplary, and are not intended to limit the present disclosure. A plurality of disclosures may be described in relation to one embodiment below. Constituent elements not described in a claim are described as optional for the disclosure according to the claim. The drawings are schematic diagrams that include exaggeration, omission, and scale adjustment as appropriate, in order to illustrate the present disclosure, and may be different from the actual shapes, positional relationship, or scale.

Figure 1:
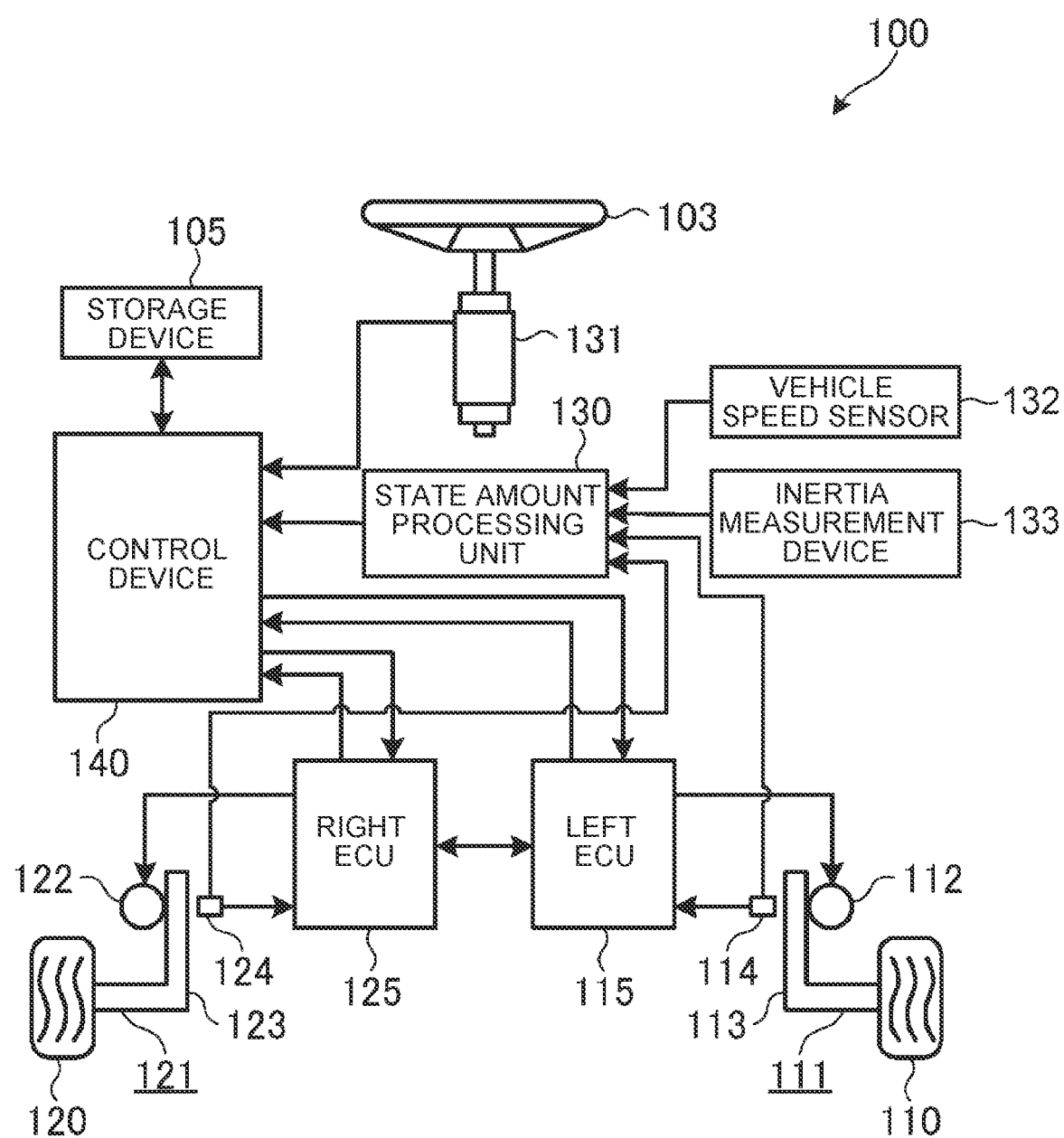
FIG. 1 illustrates the overall configuration of a steering device according to an embodiment.

First, the overall configuration of a steering device 100 for a vehicle 101 according to the embodiment of the present disclosure will be described. FIG. 1 is a block diagram illustrating the overall configuration of a steering device according to the embodiment. In the steering device 100, a right steered wheel 120 and a left steered wheel 110 mounted on the vehicle 101 such as a passenger car are not coupled to each other by a mechanical element such as a link, and the right steered wheel 120 and the left steered wheel 110 can be steered independently. In the case of the present embodiment, the steering device 100 constitutes a linkless steer-by-wire system in which the right and left steered wheels can be steered based on a signal output by a steering member 103. The steering device 100 includes: the steering member 103 which is operable by a driver for steering; the right steered wheel 120 and the left steered wheel 110 which are disposed on the front side of the vehicle 101 in the travel direction; a right steering operation mechanism 121 that individually steers the right steered wheel 120; and a left steering operation mechanism 111 that individually steers the left steered wheel 110.

The right steering operation mechanism 121 and the left steering operation mechanism 111 include a right actuator 122 and a left actuator 112, respectively, that are controlled in accordance with an operation to rotate the steering member 103. In the case of the present embodiment, the right actuator 122 and the left actuator 112 are each an electric motor.

The right steering operation mechanism 121 and the left steering operation mechanism 111 have a right steering operation structure 123 and a left steering operation structure 113 that steer the right steered wheel 120 and the left steered wheel 110, respectively. The right steering operation structure 123 and the left steering operation structure 113 are supported on the vehicle body by a suspension. The left steering operation structure 113 steers the left steered wheel 110 using a rotational drive force received from the left actuator 112. The right steering operation structure 123 steers the right steered wheel 120 using a rotational drive force received from the right actuator 122.

The steering device 100 further includes a steering angle sensor 131 that detects the steering angle of the steering member 103. The steering angle sensor 131 detects the rotational angle and the angular speed of a rotary shaft of the steering member 103, and outputs the detected value as a steering command value. The steering device 100 also includes a right sensor 124 that detects the steered angle of the right steered wheel 120, and a left sensor 114 that detects the steered angle of the left steered wheel 110.

The vehicle 101 is provided with a vehicle speed sensor 132 that detects a speed V of the vehicle 101, and an inertia measurement device 133. The inertia measurement device 133 includes a gyro sensor, an acceleration sensor, a geomagnetic sensor, etc., for example. The inertia measurement device 133 detects the acceleration and the angular speed of the vehicle 101 in three-axis directions, etc. Examples of the three-axis directions of the angular speed include yawing, pitching, and rolling directions. The inertia measurement device 133 detects the angular speed in the yawing direction (hereinafter referred to as "yaw rate"), for example. The inertia measurement device 133 may further detect the angular speed in the pitching and rolling directions.

The vehicle speed sensor 132, the inertia measurement device 133, etc. are connected to a state amount processing unit 130. The state amount processing unit 130 outputs information from the various sensors to a control device 140 as state amounts. The state amount processing unit 130 occasionally generates state amounts that indicate the behavior of the vehicle 101 by computing the information from the various sensors, and outputs the state amounts to the control device 140.

The steering device 100 also includes the control device 140 and a storage device 105. The storage device 105 may be disposed separately from the control device 140 and electrically connected to the control device 140, or may be included in the control device 140. The left steering operation mechanism 111 includes a left electronic control unit (ECU) 115. The right steering operation mechanism 121 includes a right ECU 125. The control device 140 is electrically connected to the right ECU 125, the left ECU 115, the steering angle sensor 131, the vehicle speed sensor 132, and the inertia measurement device 133. The left ECU 115 is electrically connected to the control device 140, the left sensor 114, the left actuator 112, and the right ECU 125. The right ECU 125 is electrically connected to the control device 140, the right sensor 124, the right actuator 122, and the left ECU 115. Communication among the control device 140, the right ECU 125, the left ECU 115, the right actuator 122, the left actuator 112, the state amount processing unit 130, and the various sensors may be performed via an in-vehicle network such as a controller area network (CAN).

The control device 140 performs feedback control based on information etc. acquired from the steering angle sensor 131, the vehicle speed sensor 132, the inertia measurement device 133, the right ECU 125, and the left ECU 115, and outputs appropriate right steering command value and left steering command value to the right ECU 125 and the left ECU 115, respectively. The control device 140 will be discussed in detail later.

The storage device 105 can store various pieces of information, and can take out and output the stored information. The storage device 105 is implemented by a storage device such as a read only memory (ROM), a random access memory (RAM), a semiconductor memory such as a flash memory, a hard disk drive, or a solid state drive (SSD).

Next, the control device 140 will be discussed in detail. The control device 140, the right ECU 125, and the left ECU 115 may be constituted of a microcomputer that includes a processor such as a central processing unit (CPU) or a digital signal processor (DSP) and a memory. The memory may be a volatile memory such as a RAM or a non-volatile memory such as a ROM, or may be the storage device 105. All or some of the functions of the control device 140, the state amount processing unit 130, the right ECU 125, and the left ECU 115 may be achieved by the CPU executing a program stored in the ROM using the RAM as a work memory.

Figure 2:
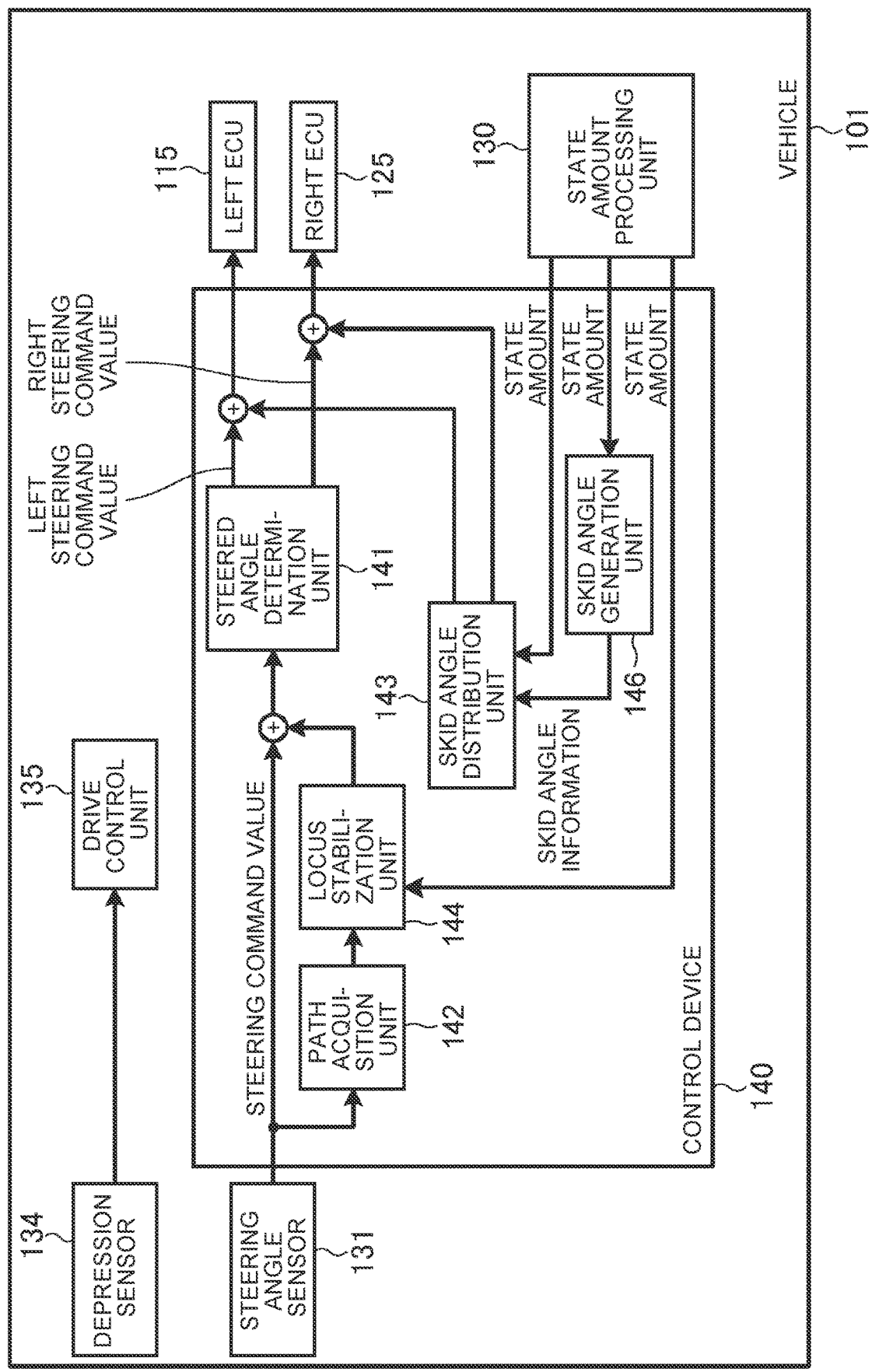
FIG. 2 is a block diagram illustrating the functional configuration of a control device according to the embodiment together with various components of a vehicle.

FIG. 2 is a block diagram illustrating the functional configuration of the control device 140. The control device 140 is a device that independently controls the respective steered angles of the right steered wheel 120 and the left steered wheel 110 which are disposed on the right and left sides with respect to the advancing direction of the vehicle 101, and includes a steered angle determination unit 141, a path acquisition unit 142, a skid angle distribution unit 143, and a locus stabilization unit 144. In the case of the present embodiment, the control device 140 includes a skid angle generation unit 146. The control on the vehicle speed of the vehicle 101 is executed by a drive control unit 135 controlling an engine, a motor, etc. based on information from a depression sensor 134 attached to an accelerator pedal etc. to detect the amount of depression of the pedal.

The steered angle determination unit 141 determines a right steering command value, which indicates the steered angle of the right steered wheel 120, and a left steering command value, which indicates the steered angle of the left steered wheel 110, based on a steering command value that indicates the steering direction of the vehicle 101. In the case of the present embodiment, the steered angle determination unit 141 acquires the rotational angle of the rotary shaft of the steering member 103 from the steering angle sensor 131 as a steering command value, performs computation based on a so-called overall steering gear ratio, which is a predetermined ratio, and an inner wheel steered angle and an outer wheel steered angle based on the Ackermann-Jeantaud theory, and outputs a right steering command value and a left steering command value.

The left ECU 115 steers the left steered wheel 110 by driving the left actuator 112 in accordance with the acquired left steering command value. The right ECU 125 steers the right steered wheel 120 by driving the right actuator 122 in accordance with the acquired right steering command value.

The path acquisition unit 142 acquires path information that indicates a target path for the vehicle 101. In the case of the present embodiment, the vehicle 101 is steered based on only an operation of the steering member 103 by the driver, and therefore the path acquisition unit 142 acquires information from the steering angle sensor 131 as path information. The path acquisition unit 142 may generate path information by performing computation based on information from the steering angle sensor 131 such as the rotational angle and the angular speed of the steering member 103, for example. This generation of path information is also included in the acquisition of path information. Further, path information may be acquired in addition to the vehicle speed.

The locus stabilization unit 144 corrects the steering command value based on at least one of a plurality of state amounts that indicate the behavior of the vehicle 101 during travel such that the vehicle 101 travels along the target path which is acquired by the path acquisition unit 142. When the right and left steering command values are corrected by the skid angle distribution unit 143, the steered angles of the right and left steered wheels are individually varied. The total sum of generated tire lateral forces is varied based on such variations, and the travel locus (turning locus) of the vehicle 101 through a curve is fluctuated. Therefore, the locus stabilization unit 144 corrects the steering command value. For example, the locus stabilization unit 144 derives a target yaw rate from the target path and the state amounts which are obtained from the state amount processing unit 130, and corrects the steering command value so as to maintain the target yaw rate. In addition, the locus stabilization unit 144 derives a target curvature (the reciprocal of a turning radius) during a turn from the target path and the state amounts, and corrects the steering command value so as to maintain the target curvature.

The skid angle distribution unit 143 optimizes the behavior of the vehicle by correcting the right steering command value and the left steering command value based on skid angle information that indicates the skid angle of the right steered wheel 120 and the skid angle of the left steered wheel 110 so as to bring the distribution ratio between the skid angle of the right steered wheel 120 and the skid angle of the left steered wheel 110 to a target distribution ratio.

The inventors have found that the sum of the cornering drag of the right steered wheel 120 and the cornering drag of the left steered wheel 110 is represented by a quadratic function having the distribution ratios of the right and left skid angles as variables, and that a function of the sum of the cornering drags has a local minimum value in a predetermined range including a value at which the distribution ratios of the right and left skid angles are equal.

In the case of the present embodiment, the skid angle distribution unit 143 acquires information that the path that the vehicle 101 is to travel is curved from the path acquisition unit 142 etc., and determines the distribution ratio based on the state amounts such as the vehicle speed which are acquired from the state amount processing unit 130 such that the target distribution ratio during a turn of the vehicle 101 is in a predetermined range including a value at which the skid angle of the right steered wheel 120 and the skid angle of the left steered wheel 110 are equal, in order to reduce drive energy required to maintain the vehicle speed by reducing the sum of the cornering drag of the right steered wheel 120 and the cornering drag of the left steered wheel 110. The phrase "predetermined range including a value at which the skid angle of the right steered wheel 120 and the skid angle of the left steered wheel 110 are equal" is used to indicate a range in which the target distribution ratio is about 0.5±0.1.

In addition, the skid angle distribution unit 143 changes the target distribution ratio to a state of deviating to one side in the case where a predetermined condition is met. The predetermined condition is not specifically limited. For example, the predetermined condition may be met in the case where the vehicle 101 is accelerating to an acceleration threshold or more based on the state amounts which are acquired from the state amount processing unit 130, even when an accelerator pedal is not depressed based on information from the depression sensor 134. Examples of the target distribution ratio deviating to one side include a target distribution ratio that is more than 0.6 (e.g. 1) and a target distribution ratio that is less than 0.4 (e.g. 0).

In the case where the target distribution ratio is determined as described above, the sum of the cornering drags is increased, the vehicle 101 can be braked, and the burden on brakes can be reduced while maintaining stable travel along the target path on a long downward slope etc.

Figure 3:
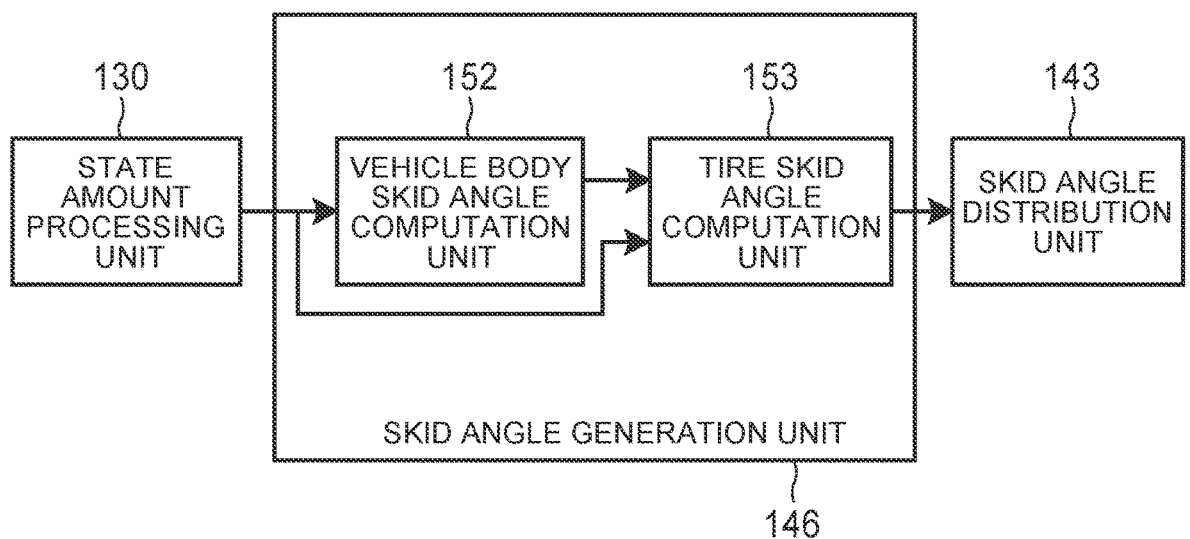
FIG. 3 is a block diagram illustrating the functional configuration of a skid angle generation unit.

The skid angle distribution unit 143 corrects the right steering command value and the left steering command value so as to bring the distribution ratio between the skid angle of the right steered wheel 120 and the skid angle of the left steered wheel 110, which are generated by the skid angle generation unit 146, to the target distribution ratio. FIG. 3 is a block diagram illustrating the functional configuration of the skid angle generation unit. As illustrated in the drawing, the skid angle generation unit 146 includes a vehicle body skid angle computation unit 152 and a tire skid angle computation unit 153.

The vehicle body skid angle computation unit 152 computes the skid angle of the entire vehicle 101 based on the yaw rate which is acquired from the state amount processing unit 130, the speed of the vehicle 101, and the acceleration (in the lateral direction and the front-rear direction) of the vehicle 101.

The tire skid angle computation unit 153 calculates the respective tire skid angles of the right steered wheel 120 and the left steered wheel 110 based on the vehicle body skid angle which is acquired from the vehicle body skid angle computation unit 152, the yaw rate which is acquired from the state amount processing unit 130, and the actual steered angle of the right steered wheel 120 and the actual steered angle of the left steered wheel 110 which are acquired from the state amount processing unit 130.

In the present embodiment, feedback control is performed on the steered angle of the right steered wheel 120 and the steered angle of the left steered wheel 110 so as to bring the tire skid angles of the wheels, which are disposed on the right and left sides of the vehicle 101, to the target distribution ratio. Thus, it is possible to improve the fuel efficiency performance by suppressing the cornering drags of the vehicle 101, and reduce the burden on the brakes and maintain stable travel by braking the vehicle 101 based on the steered wheels.

In addition, two feedback controls in which the steering command values for determining the right and left steering command values are also corrected based on the state amounts are executed independently. Thus, it is possible to steer the vehicle 101 with a so-called on-the-rail feel, which allows steering the vehicle 101 along the travel path in correspondence with an operation of the steering member 103, while suppressing the sum of the cornering drags of the vehicle 101, for example.

The present disclosure is not limited to the embodiment described above. For example, the constituent elements described herein may be combined as desired, or some of the constituent elements may be excluded, to implement different embodiments of the present disclosure. In addition, the present disclosure also includes modifications obtained by a person skilled in the art making various conceivable changes to the embodiment described above without departing from the scope and spirit of the present disclosure, that is, the meaning of the language used in the claims.

Figure 4:
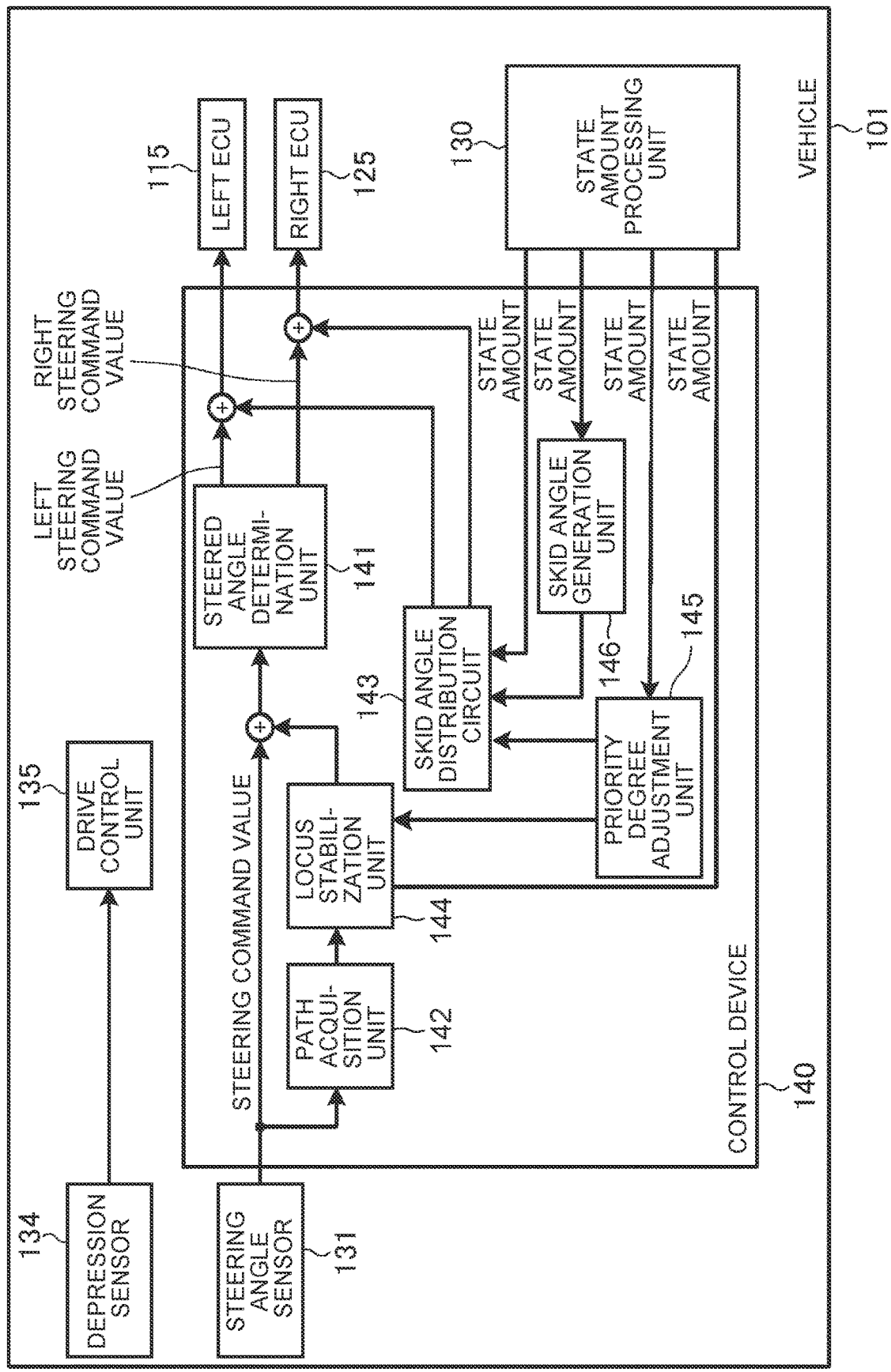
FIG. 4 is a block diagram illustrating the functional configuration of a control device according to a first additional example together with various components of a vehicle.

For example, as illustrated in FIG. 4, the control device 140 may include a priority degree adjustment unit 145. The priority degree adjustment unit 145 varies the control priority degree of the locus stabilization unit 144 with respect to the control priority degree of the skid angle distribution unit 143 in the case where it is determined based on at least one of a plurality of state amounts that indicate the behavior of the vehicle 101 during travel that the vehicle 101 is in a predetermined state, compared to the case where the vehicle 101 is not in the predetermined state. Consequently, smooth control that causes no vibration etc. can be achieved by adjusting the respective control priority degrees of the skid angle distribution unit 143, which individually performs feedback correction of the right steering command value and the left steering command value based on the state amounts which are obtained from the state amount processing unit 130, and the locus stabilization unit 144, which performs feedback correction of the steering command values for generating the right steering command value and the left steering command value based on the state amounts which are obtained from the state amount processing unit 130 as well.

The adjustment of the priority degrees by the priority degree adjustment unit 145 is performed by changing time constants for the skid angle distribution unit 143 and the locus stabilization unit 144, for example. Specifically, the priority degree adjustment unit 145 may change a time constant by adjusting at least one of the control cycle and the control gain of the skid angle distribution unit 143 and the locus stabilization unit 144, for example.

Specifically, the predetermined state is assumed to be a state in which the amount of deviation between a target curvature for the vehicle 101 and the actual travel curvature is equal to or more than a predetermined value. In the case where it is determined based on the yaw rate, the vehicle speed, etc. that the vehicle 101 is in the predetermined state, the priority degree adjustment unit 145 reduces the control priority degree of the skid angle distribution unit 143 by extending the control cycle thereof compared to that during normal travel, and increases the control priority degree of the locus stabilization unit 144 by shortening the control cycle thereof compared to that during normal travel. Specifically, the control cycles of the skid angle distribution unit 143 and the locus stabilization unit 144 are changed such that the ratio of the control cycle of the locus stabilization unit 144 to the control cycle of the skid angle distribution unit 143 in the predetermined state is the inverse of such a ratio during normal travel, for example. Alternatively, the control cycle of the skid angle distribution unit 143 may be extended compared to that during normal travel and the control cycle of the locus stabilization unit 144 may be shortened compared to that during normal travel in such a range that the ratio of the control cycle of the locus stabilization unit 144 to the control cycle of the skid angle distribution unit 143 in the predetermined state is not reversed from such a ratio during normal travel. A control gain (e.g. at least one of gains in PID control) may be adjusted, rather than the control cycles.

Figure 5:
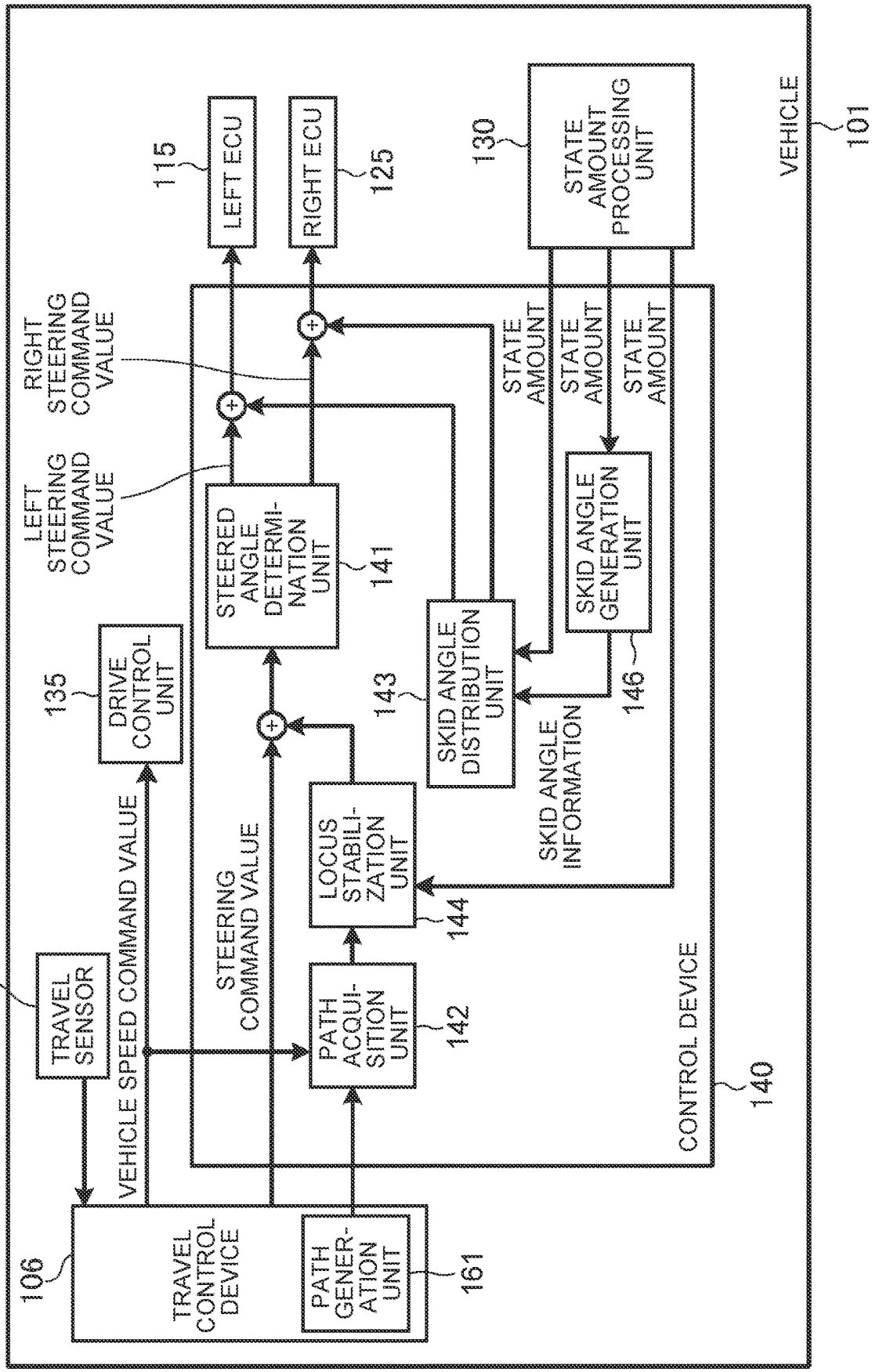
FIG. 5 is a block diagram illustrating the functional configuration of a control device according to a second additional example together with various components of a vehicle.

The vehicle 101 may include an assist mode in which steering of the vehicle 101 performed using the steering member 103 is assisted, an autonomous drive mode in which autonomous drive in which the steering member 103 is not used is performed, etc. In this case, as illustrated in FIG. 5, the vehicle 101 includes a travel sensor 162 that enables autonomous drive, and a travel control device 106 that controls or assists travel of the vehicle 101 based on information from the travel sensor 162.

The travel sensor 162 is a sensor that acquires information that is necessary for autonomous travel of the vehicle 101. The travel sensor 162 is not specifically limited, and may include a plurality of types of sensors. Examples of the travel sensor 162 include a camera that acquires information for generating a travel path such as the position of a mark such as a white line provided on the road surface, a sensor that acquires the position of the vehicle 101 in map information, a radar that detects an obstacle ahead of the vehicle, etc.

The travel control device 106 controls travel of the vehicle 101 based on information from the travel sensor 162 etc. The travel control device 106 determines a target vehicle speed for the vehicle 101, and outputs a vehicle speed command value that matches the target vehicle speed to the drive control unit 135. In addition, the travel control device 106 includes a path generation unit 161. The path generation unit 161 generates a path to be followed by the vehicle 101 based on the map information or the information from the travel sensor 162, and outputs the generated path as path information.

In addition, the travel control device 106 outputs a steering command value based on the current position of the vehicle 101, the path information which is generated by the path generation unit 161, etc.

In the case of the assist mode, the autonomous drive mode, etc., the steered angle determination unit 141 of the control device 140 generates a right steering command value and a left steering command value based on the steering command value which is output from the travel control device 106. The skid angle distribution unit 143 corrects the right steering command value and the left steering command value based on the state amounts, irrespective of whether the vehicle is in the assist mode, the autonomous drive mode, etc. The path acquisition unit 142 adds the vehicle speed command value which is output from the travel control device 106 to the path information which is acquired from the path generation unit 161, and outputs the resulting path information. The locus stabilization unit 144 corrects the steering command value based on the acquired path information.

In FIG. 5, the priority degree adjustment unit 145 which relatively adjusts the respective priority degrees of the locus stabilization unit 144 and the skid angle distribution unit 143 is not provided. In such a case, at least one of the locus stabilization unit 144 and the skid angle distribution unit 143 may adjust the priority degrees based on the state amounts.

The present disclosure may be implemented as a system, apparatus, method, integrated circuit, computer program, or storage medium such as a computer-readable storage disk, or may be implemented as any combination of the system, apparatus, method, integrated circuit, computer program, and storage medium.

For example, the processing units included in the embodiment described above may be implemented as a large scale integration (LSI) circuit which is typically an integrated circuit. Such units may be individually implemented on one chip, or some or all of such units may be implemented on one chip.

Circuit integration is not limited to LSI, and may be implemented by a dedicated circuit or a general-purpose processor. A field programmable gate array (FPGA) that is programmable after manufacture of LSI or a reconfigurable processor that enables reconfiguration of connection or setting of circuit cells inside LSI may also be utilized.

In the embodiment described above, each constituent element may be constituted of dedicated hardware, or implemented by executing a software program that is suitable for the constituent element. Each constituent element may also be implemented by a program execution unit such as a processor such as a CPU reading and executing a software program stored in a storage medium such as a hard disk or a semiconductor memory.

In addition, some or all of the constituent elements described above may be constituted from a removable integrated circuit (IC) card or a single module. The IC card or the module is a computer system constituted from a microprocessor, a ROM, a RAM, etc. The IC card or the module may include the LSI described above or a system LSI circuit. The IC card or the module achieves its function by the microprocessor operating in accordance with a computer program. The IC card and the module may be tamper-resistant.

The present disclosure is useful for steering devices with independent mechanisms that steer respective steered wheels.

What is claimed is:

1. A control device independently controls respective steered angles of a right steered wheel and a left steered wheel disposed on right and left sides with respect to an advancing direction of a vehicle, the control device comprising an electronic control unit, wherein:
the electronic control unit is configured to determine a right steering command value, which indicates the steered angle of the right steered wheel, and a left steering command value, which indicates the steered angle of the left steered wheel, based on a steering command value that indicates a steering direction of the vehicle;
the electronic control unit is configured to acquire path information that indicates a target path for the vehicle;
the electronic control unit is configured to correct the steering command value based on at least one of a plurality of state amounts that indicate a behavior of the vehicle during travel such that the vehicle travels along the target path; and
the electronic control unit is configured to correct the right steering command value and the left steering command value based on skid angle information that indicates a skid angle of the right steered wheel and a skid angle of the left steered wheel so as to bring a distribution ratio between the skid angle of the right steered wheel and the skid angle of the left steered wheel to a target distribution ratio.

2. The control device according to claim 1, wherein the electronic control unit is configured to determine the target distribution ratio during a turn of the vehicle as a distribution ratio in a predetermined range in which a sum of a cornering drag of the right steered wheel and a cornering drag of the left steered wheel includes a local minimum value.

3. The control device according to claim 1, wherein the electronic control unit is configured to determine the target distribution ratio as a distribution ratio in a predetermined range in which the skid angle of the right steered wheel and the skid angle of the left steered wheel are equal to each other.

4. The control device according to claim 1, wherein the electronic control unit is configured to change the target distribution ratio to a state of deviating to one side in the case where a predetermined condition is met.

5. A steering device comprising:
a control device configured to independently control respective steered angles of a right steered wheel and a left steered wheel disposed on right and left sides with respect to an advancing direction of a vehicle, the control device including an electronic control unit,
the electronic control unit being configured to determine a right steering command value, which indicates the steered angle of the right steered wheel, and a left steering command value, which indicates the steered angle of the left steered wheel, based on a steering command value that indicates a steering direction of the vehicle,
the electronic control unit being configured to acquire path information that indicates a target path for the vehicle,
the electronic control unit being configured to correct the steering command value based on at least one of a plurality of state amounts that indicate a behavior of the vehicle during travel such that the vehicle travels along the target path, and
the electronic control unit being configured to correct the right steering command value and the left steering command value based on skid angle information that indicates a skid angle of the right steered wheel and a skid angle of the left steered wheel so as to bring a distribution ratio between the skid angle of the right steered wheel and the skid angle of the left steered wheel to a target distribution ratio;
a left steering operation mechanism that includes a left actuator that steers the left steered wheel; and a right steering operation mechanism that includes a right actuator that steers the right steered wheel.

* * * * *